US012732065B2

(12) United States Patent
Vanhee et al.

(10) Patent No.: US 12,732,065 B2
(45) Date of Patent: Sep. 8, 2026

(54) SYSTEMS FOR ROTOR ASSEMBLY INCLUDING A LUBRICANT DISTRIBUTOR

(71) Applicant: Dana Automotive Systems Group, LLC, Maumee, OH (US)

(72) Inventors: Steven Vanhee, Hooglede (BE); Alexandre Pare, Saint-Amable (CA); Enrico Moschetti, Turin (IT); Jaywant S. Pawar, Pune (IN); Joachim Druant, Houthulst (BE); Frederik Desmet, Maldegem (BE); Luke Miller, Montreal (CA); Sergio De Santis, Turin (IT); Carl Trudel, Boucherville (CA)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 673 days.

(21) Appl. No.: 18/048,359

(22) Filed: Oct. 20, 2022

(65) Prior Publication Data

US 2023/0402900 A1 Dec. 14, 2023

Related U.S. Application Data

(60) Provisional application No. 63/366,047, filed on Jun. 8, 2022.

(51) Int. Cl.
*H02K 9/19* (2006.01)
*B60K 1/00* (2006.01)
*H02K 7/00* (2006.01)

(52) U.S. Cl.
CPC ............... *H02K 9/19* (2013.01); *H02K 7/003* (2013.01); *B60K 1/00* (2013.01)

(58) Field of Classification Search
CPC .......... H02K 7/003; H02K 9/19; H02K 9/193; B60K 1/00; B60K 2001/003; B60K 2001/006
See application file for complete search history.

(56) References Cited

U.S. PATENT DOCUMENTS 9,257,883 B2 2/2016 Büttner et al.
10,352,351 B2 7/2019 Goldstein et al.
10,790,725 B2 9/2020 Paul et al.
2017/0373562 A1 12/2017 Convert
(Continued)

FOREIGN PATENT DOCUMENTS

WO WO-2019208641 A1 * 10/2019 .............. B60K 1/00
WO WO-2022180875 A1 * 9/2022

OTHER PUBLICATIONS

Sasaki, Machine Translation of WO202218087, Sep. 2022 (Year: 2022).*

*Primary Examiner* — Eric Johnson
(74) *Attorney, Agent, or Firm* — McCoy Russell LLP

(57) ABSTRACT

Systems are provided for an electric motor. In one example, a rotor assembly of the electric motor includes a shaft, a lubricant distributor inserted into the shaft, the lubricant distributor comprising a first section comprising a plurality of first nozzles and a second section comprising a plurality of second nozzles, the lubricant distributor further comprising an overflow portion arranged between the first and second sections, and a stationary lance positioned adjacent to the first section of the lubricant distributor, the lance comprising a plurality of radial nozzles. The rotor assembly controls coolant flow towards the rotor and bearings, helping to decrease drag losses.

19 Claims, 6 Drawing Sheets

(56) References Cited

U.S. PATENT DOCUMENTS

| | | | | |
|---|---|---|---|---|
| 2021/0237567 | A1* | 8/2021 | Tsuchihashi ........ | F16H 57/0424 |
| 2022/0060072 | A1 | 2/2022 | Michael | |
| 2022/0337113 | A1* | 10/2022 | Dang .................. | H02K 5/1732 |

* cited by examiner

SYSTEMS FOR ROTOR ASSEMBLY INCLUDING A LUBRICANT DISTRIBUTOR

CROSS REFERENCE TO RELATED APPLICATION

The present application claims priority to U.S. Provisional Application No. 63/366,047, entitled "SYSTEMS FOR ELECTRIC MOTOR COOLING", and filed on Jun. 8, 2022. The entire contents of the above-listed application are hereby incorporated by reference for all purposes.

TECHNICAL FIELD

The present description relates generally to systems for cooling windings, the rotor, and bearings of an electric motor.

BACKGROUND AND SUMMARY

Vehicles may be equipped via electrical energy storage devices to decrease vehicular contributions to global warming. An electric motor may be configured to operate via the electrical energy, wherein the electric motor may drive one or more wheels of the vehicle. Like an engine, the electric motor may demand cooling during certain operating conditions.

An efficiency of the electric motor may be at least partially based on an efficiency of the cooling provided to the electric motor and its various components. Stator windings may represent one component in which previous examples of cooling may be insufficient. Other components which may demand enhancements in cooling may include the rotor and bearings of the motor.

In one example, the issues described above may be addressed by a rotor assembly of an electric motor including a shaft, a lubricant distributor inserted into the shaft, the lubricant distributor comprising a first section comprising a plurality of first nozzles and a second section comprising a plurality of second nozzles, the lubricant distributor further comprising an overflow portion arranged between the first and second sections, and a lance positioned adjacent to the first section of the lubricant distributor, the lance comprising a plurality of radial nozzles.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
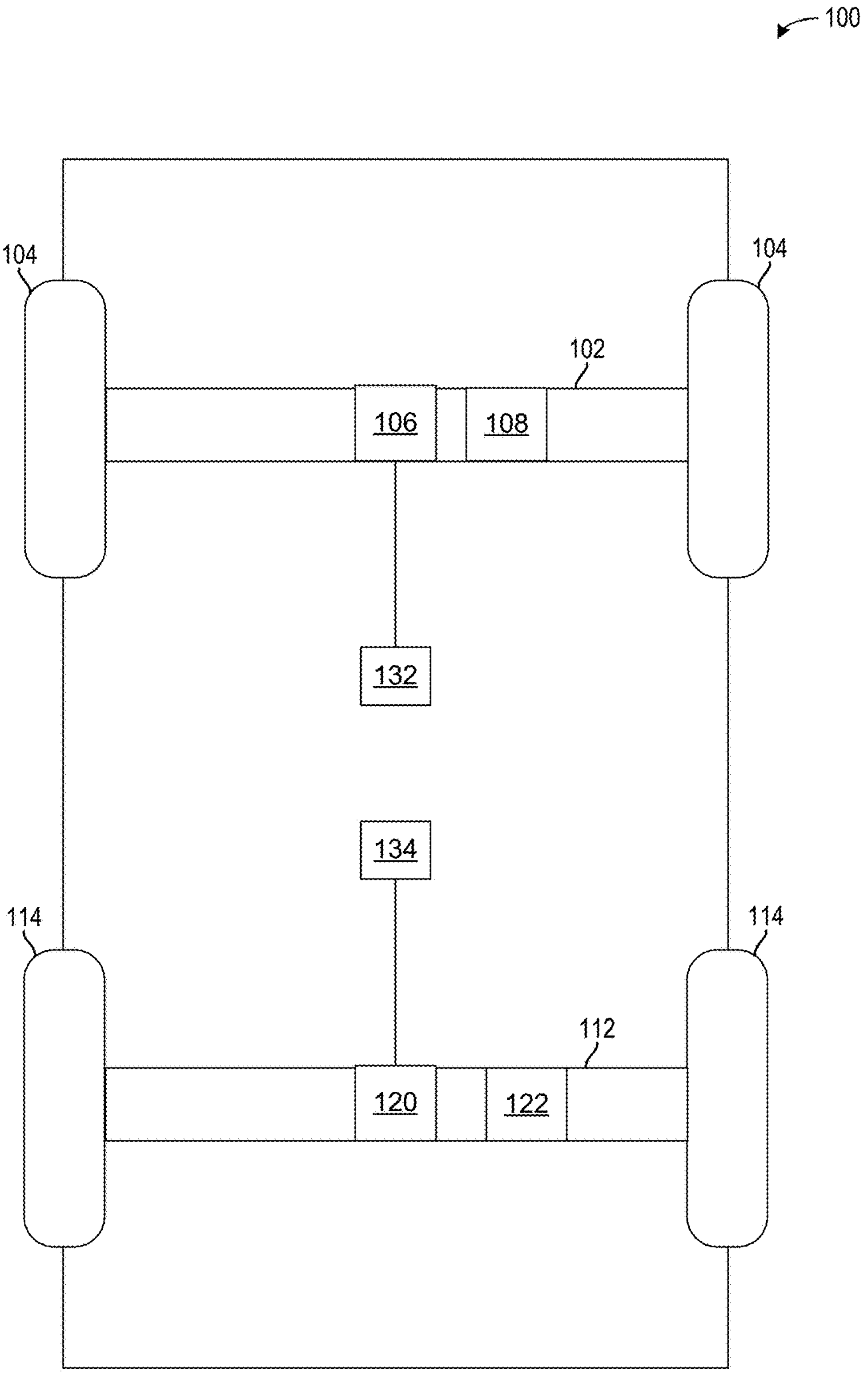
FIG. 1 shows a vehicle at least partially driven via an electric motor.
Figure 2:
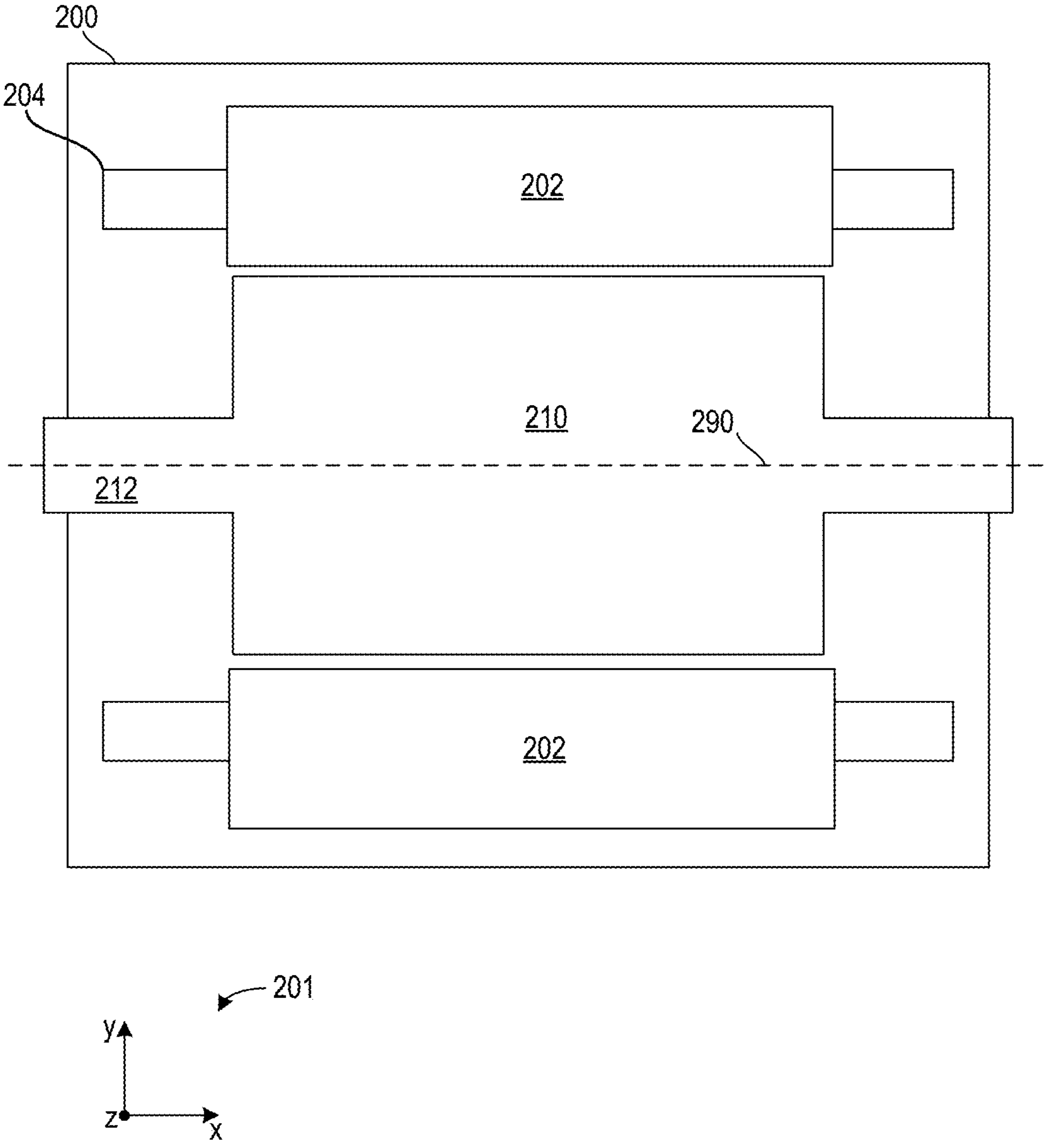
FIG. 2 shows a cross-section of the electric motor.
Figure 3:
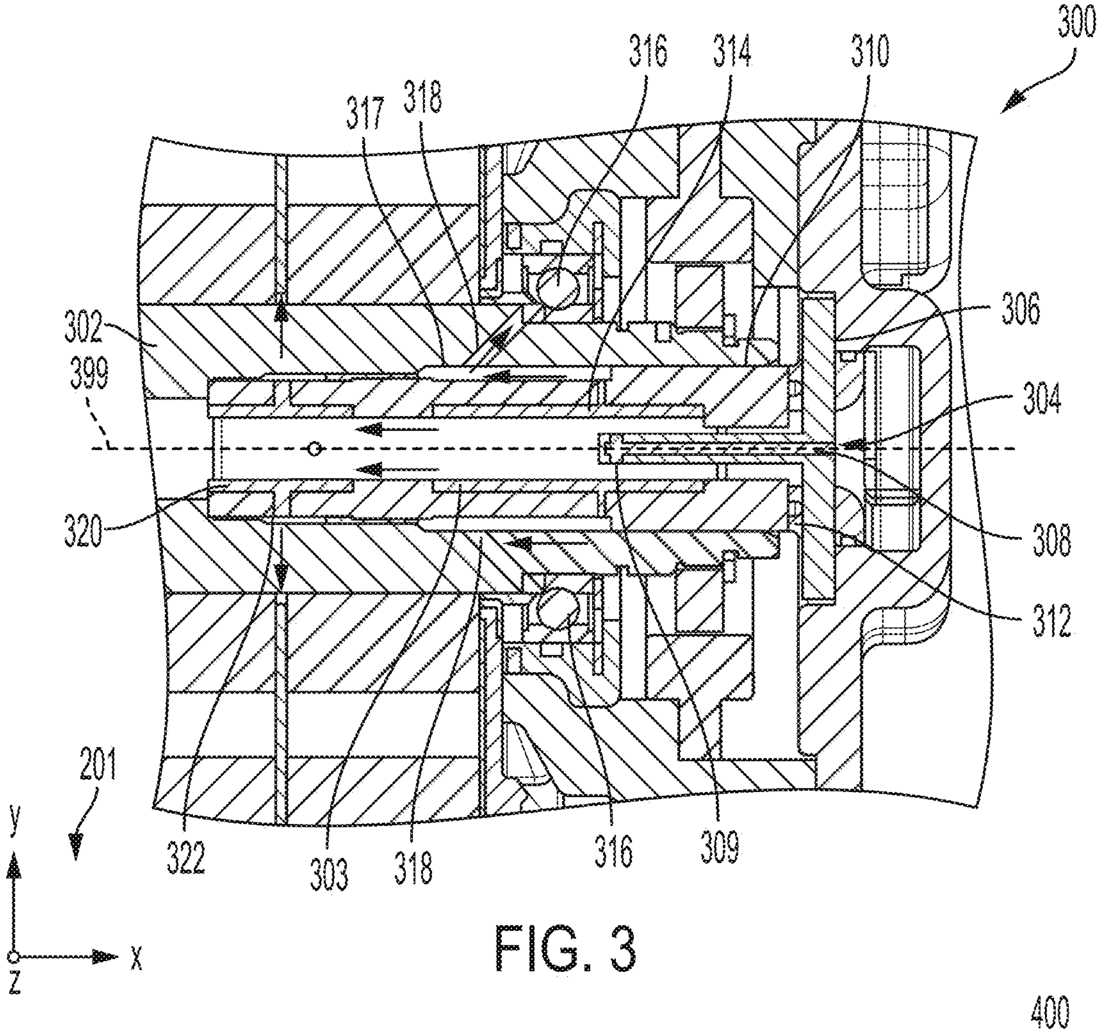
FIG. 3 shows a detailed view of a shaft of the electric motor.
Figure 4:
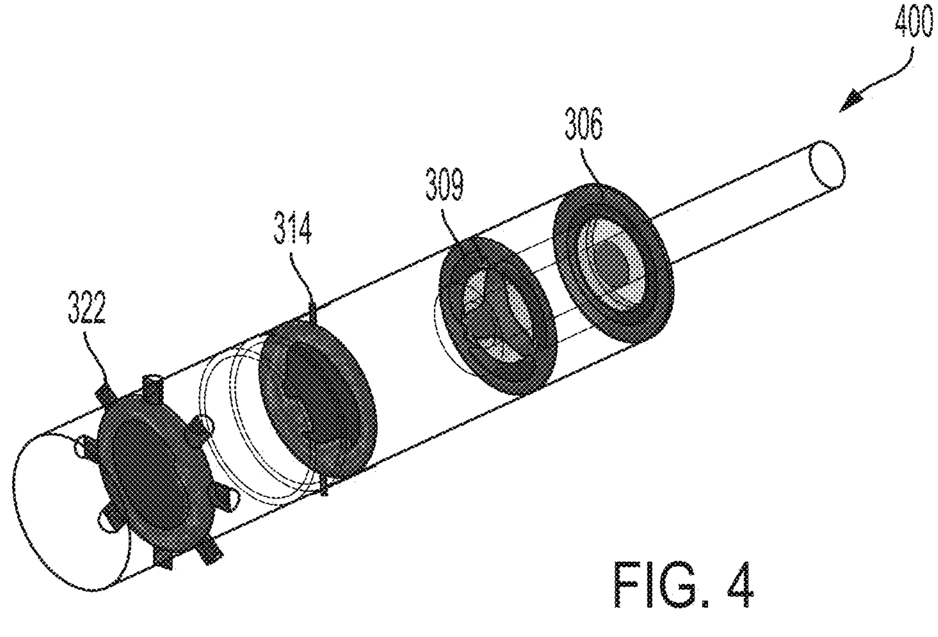
FIG. 4 shows an example of orifices of bearings of the shaft.
Figure 5:
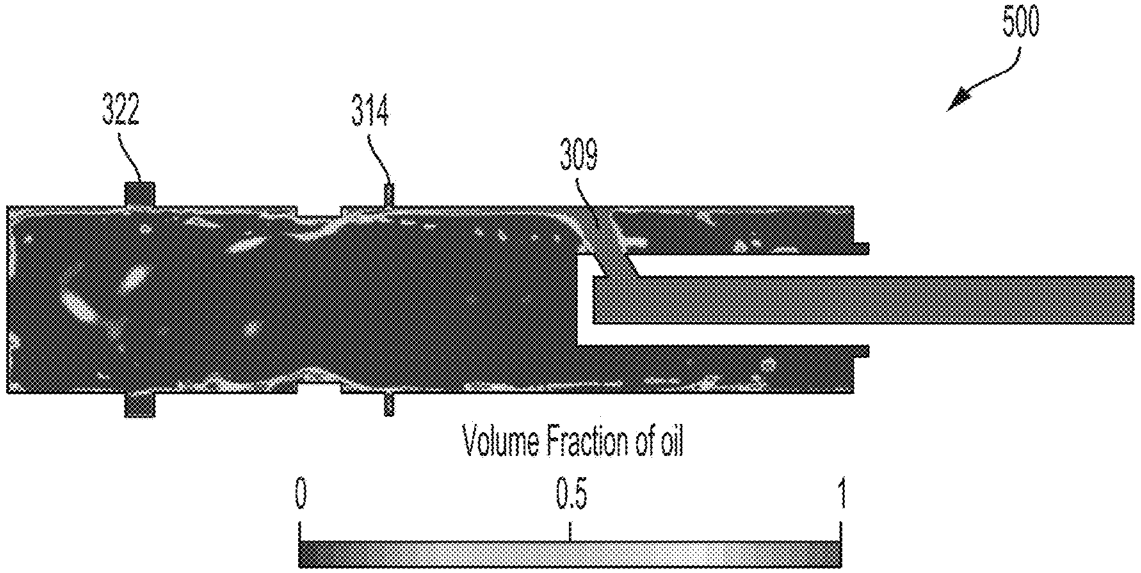
FIG. 5 shows a detailed view of an oil inlet of the shaft.
Figure 6:
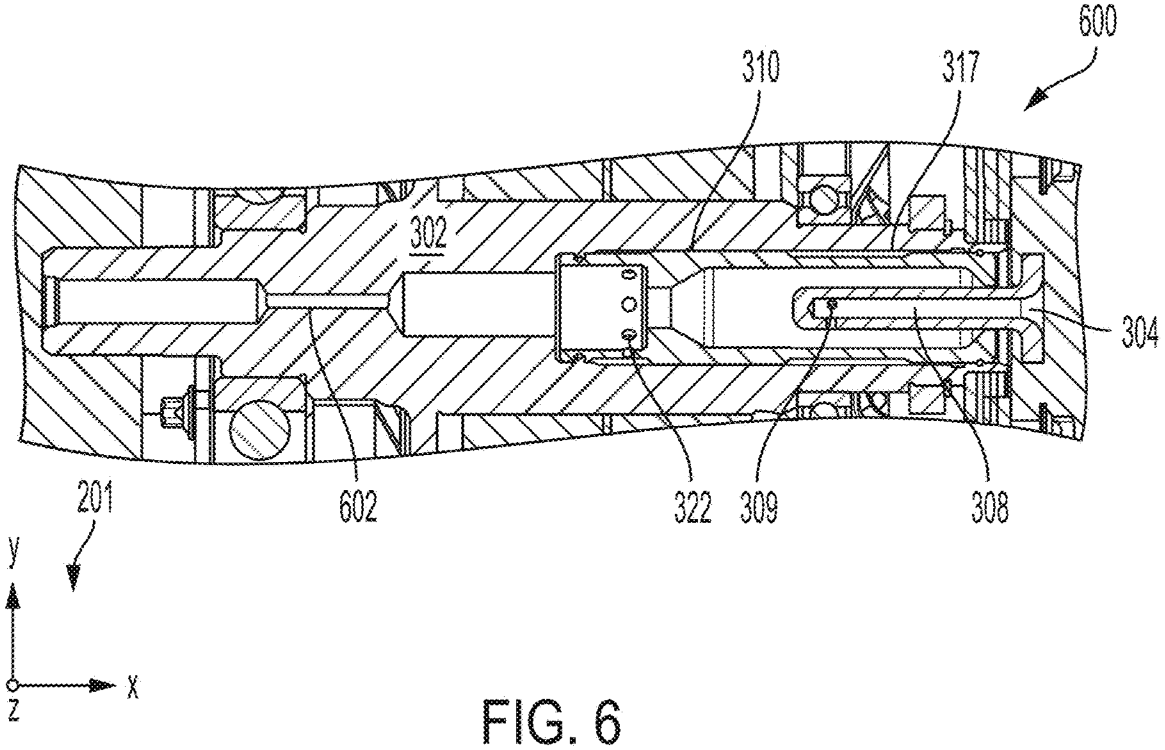
FIG. 6 shows an additional embodiment of the shaft.
Figure 7:
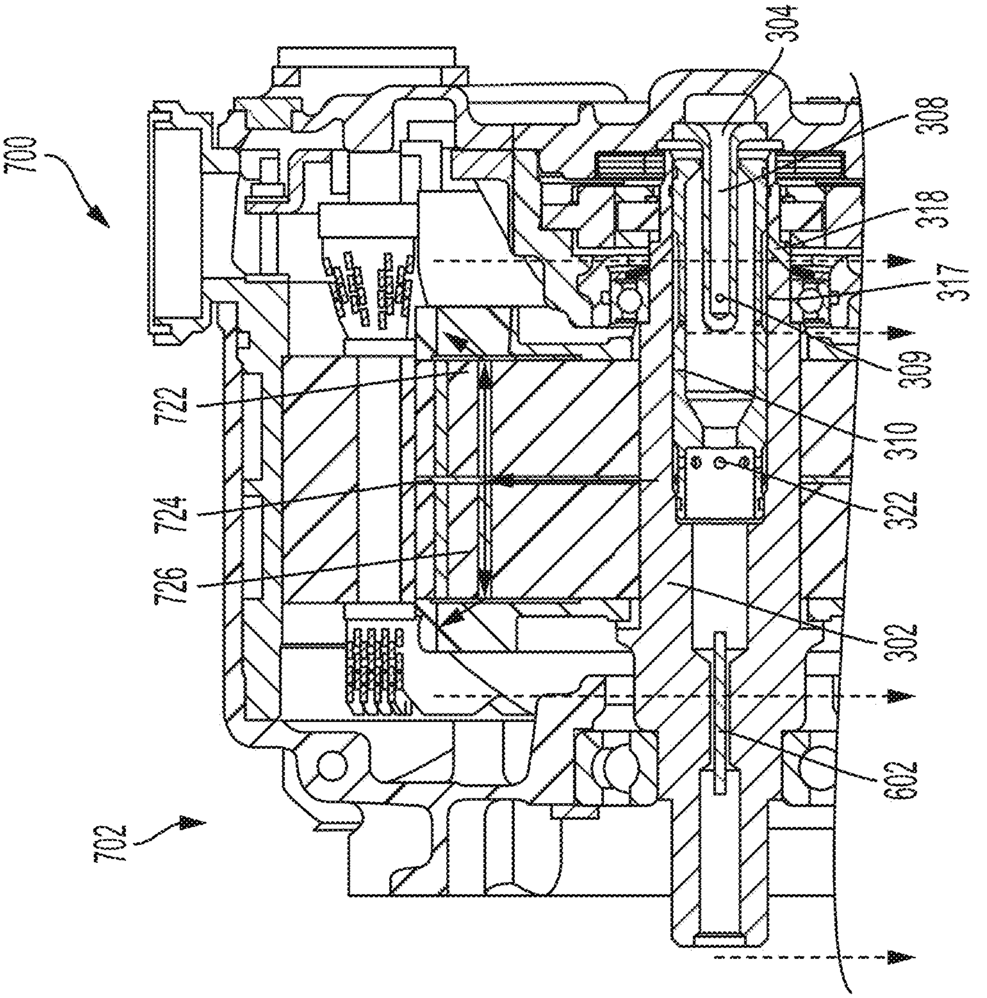
FIG. 7 shows a view of the shaft with a lubricant distributor in an electric motor.
Figure 8:
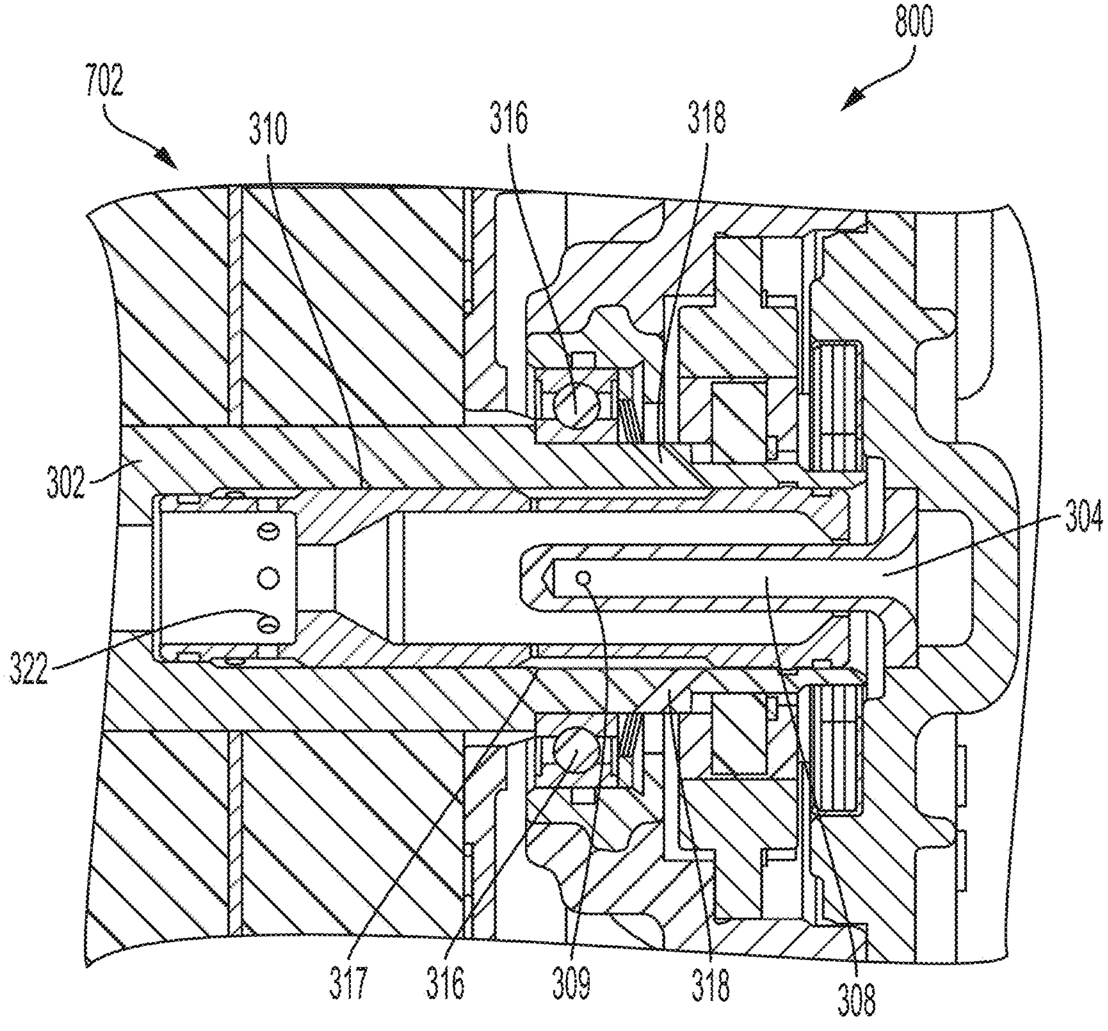
FIG. 8 shows a detailed view of an inlet of the lubricant distributor arranged in the electric motor.

The following description relates to systems for a cooling arrangement for a drive unit. In one example, the drive unit is an electric motor of a vehicle, as illustrated in FIG. 1. The cooling arrangement may be an oil-based cooling arrangement fluidly coupled to the electric motor and a gear housing, as illustrated in FIG. 2. FIG. 3 shows a detailed view of a shaft of the electric motor. FIG. 4 shows an example of orifices of bearings of the shaft. FIG. 5 shows a detailed view of an oil inlet of the shaft. FIG. 6 shows an additional embodiment of the shaft. FIG. 7 shows a view of the shaft with a lubricant distributor in an electric motor. FIG. 8 shows a detailed view of an inlet of the lubricant distributor arranged in the electric motor.

In oil cooled electric motors, it may be desired to control oil flow to the rotor to reduce drag losing during certain load conditions, such as partial load conditions. While controlling the oil flow, it is desired to maintain some amount of oil flow to the bearing to maintain lubrication thereof.

In one example, the present disclosure may include a static lance with a plurality of radial nozzles. Lubricant may be introduced via the static lance and sprayed on an inner diameter of a lubricant distributor shaft insert. The sprayed lubricant may form a first lubricant film. A gap may be present between the lance and the lubricant distributor configured to admit air, which may promote the formation of the lubricant film while mitigating overflow of lubrication of the lubricant distributor. A portion of the lubricant may be expelled from the distributor through a first plurality of nozzles toward an inner surface (e.g., an inner diameter) of the shaft at a location corresponding to one or more bearings. The lubricant may generate a second film on the inner diameter of the shaft before it flows to a first plurality of openings toward the bearings. This may provide additional cooling to the inner surface of the shaft and therefore cool an inner race of the bearings. Another portion of the lubricant may flow across an overflow and may be guided toward rotor laminations via a second plurality of nozzles. In one example, the second plurality of nozzles are larger than the first plurality of nozzles. By sizing the inner diameter of the overflow based on a bearing flow rate, a desired lubricant film thickness may be generated. In combination with the bearing orifices, the lubricant flow of the bearings may be determined. As such, the lubricant flow rate of the bearing may be independent of the inlet flow rate and therefore, only depend on a rotational speed of the rotor. The cooling system may be configured to flow lubricant to the bearing at a desired flow rate at a high speed of the motor. If the inlet flow rate increases, excess flow, such as flow greater than an amount desired by the bearings, may be guided toward the rotor for cooling of the motor. By doing this, over-lubrication of the bearing may be avoided.

In this way, the present disclosure may control the bearing flow rate via a shape of the system (e.g., a shape and a size of the overflow), and not via adjusting an inlet flow rate. Lubricant to the rotor may be controlled while maintaining lubrication of the bearings. The air gap may promote lubricant film formation which may reduce seal drag losses. Additionally or alternatively, increased bearing cooling may be provided as lubricant wetting the inner surface of the shaft underneath the bearing while also feeding lubricant interior to the bearing, which may reduce frictional losses of the bearings.

FIGS. 1-8 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation). FIGS. 3-4 and 6-8 are shown to scale.

Turning now to FIG. 1, it shows a vehicle 100 comprising a first shaft 102 and a second shaft 112. The first shaft 102 may be configured to drive a first set of wheels 104 and the second shaft 112 may be configured to drive a second set of wheels 114. In one example, the first shaft 102 is arranged near a front of the vehicle 100 and the second shaft 112 is arranged near a rear of the vehicle 100.

The vehicle 100 may include one or more drive units. In one example, the one or more drive units include a first electric motor 106 arranged on the first shaft 102 and a second electric motor 120 arranged on the second shaft 112. The first electric motor 106 may be coupled to a first gear box 108 and a first electrical energy storage device 132. The second electric motor 120 may be coupled to a second gear box 122 and to a second electrical energy storage device 134. The first electric motor 106, in combination with the first gear box 108 may be configured to drive the first shaft 102, which may result in rotation of the first set of wheels 104. The second electric motor 120, in combination with the second gear box 122, may be configured to drive the second shaft 112, which may result in rotation of the second set of wheels 114. In some examples, additionally or alternatively, a single battery may be configured to supply electrical energy to each of the first electric motor 106 and the second electric motor 120.

The vehicle 100 is illustrated as an all-electric vehicle comprising one or more batteries for powering one or more electric motors to drive the vehicle. In one example, the vehicle 100 is an all-electric passenger vehicle. In some examples, additionally or alternatively, the vehicle 100 may be a hybrid vehicle including an engine configured to supply power to one or more of the first shaft 102 and the second shaft 112. The examples illustrated herein may be used with different types of electric vehicles including motorcycles, aircrafts, trucks, boats, train engines, and the like.

Turning now to FIG. 2, it shows an embodiment of a side-sectional view of an electric motor 200. The electric motor 200 may be identical to the first electric motor 106 or the second electric motor 120 of FIG. 1. The motor 200 may include a stator 202. The stator 202 may comprise a hollow, cylindrical shape that surrounds an outer surface of a rotor 210 coupled to a rotor shaft 212. As illustrated, a gap, such as an air gap, may be arranged between the stator 202 and the rotor 210. The rotor 210 and the rotor shaft 212 may be included in a rotor assembly configured to control coolant flow towards the rotor and bearings, helping to decrease drag losses.

A set of reference axes 201 are provided for comparison between views shown in FIG. 2-6. The reference axes 201 indicate a y-axis, an x-axis, and a z-axis. In one example, the x-axis may be parallel a central axis 290 of the electric motor 200. When referencing direction, positive may refer to in the direction of the arrow of the y-axis, x-axis, and z-axis and negative may refer to in the opposite direction of the arrow of the y-axis, x-axis, and z-axis. The x-axis may be normal to the y-axis and the central axis 290. The z-axis may be normal to each of the y and x axes.

The rotor 210 and the stator 202 may be concentric about a central axis 290. The rotor shaft 212 may extend in a direction parallel to the central axis 290. The rotor 210 may rotate about the central axis 290 as the stator 202 remains stationary. The stator 202 may include end windings 204 extending from a body therefrom.

Turning now to FIG. 3, it shows an embodiment of a rotor shaft 302 of an electric motor 300. In one example, the electric motor 300 may be identical to the electric motor 200 of FIG. 2. The rotor shaft 302 may include an inlet 304 arranged at a first extreme end. In one example, the first extreme end is opposite a second extreme end, wherein the rotor shaft 302 may be coupled to an input shaft at the first extreme end. The inlet 304 may admit lubricant. In one example, the lubricant is oil.

The oil inlet 304 may include a lance 306 or other conduit configured to provide oil to an interior of the rotor shaft 302. The lance 306 may include a T-shape, wherein a first arm of the lance 306 is integrally arranged in a body of the electric motor 300. A second arm, normal to the first arm, may include a channel 308 through which lubricant flows to an interior channel 303 of the rotor shaft 302. The channel 308 may spray lubricant in a radially outward direction toward a lubricant distributor 310 via a plurality of radial nozzles 309.

The plurality of radial nozzles 309 may be circumferentially arranged around the second arm of the lance 306. Each of the plurality of radial nozzles 309 may be fluidly coupled to the channel 308. The plurality of radial nozzles 309 may spray lubricant in a direction normal to lubricant flow within the channel 308, which is parallel to a longitudinal axis of the second arm.

The lubricant expelled by the plurality of radial nozzles 309 may form a film on the lubricant distributor 310. In one example, a gap 312 is arranged between the lance 306 and the lubricant distributor 310. In one example, the gap 312 is an axial air intake channel. The gap may allow air to enter the interior channel 303. The air may mix with the lubricant sprayed from the plurality of radial nozzles and form a lubricant film on an interior diameter of the lubricant distributor 310. In one example, the lubricant film formed on the lubricant distributor 310 may be a first film.

In one example, the gap 312 is arranged between a stationary component (e.g., the lance 306) and a rotating component (e.g., the lubricant distributor 310). The position of the gap 312 may avoid inclusion of rotating seal or other compression/sealing element that may be prone to degradation. That is to say, the gap 312 may be sealed via the assembly of the components of the electric motor 300 such that seals specifically designed to seal the gap 312 may be omitted. By doing this, maintenance and manufacturing costs of the electric motor 300 may be decreased.

The lubricant distributor 310 may include a plurality of first nozzles 314. Lubricant may exit lubricant distributor 310 via the plurality of first nozzles 314 and flow toward bearings 316. More specifically, the lubricant may flow through the plurality of first nozzles 314 in a radially outward direction before turning in a direction parallel to a central axis 399 of the rotor shaft 302 and flowing through an outer channel 317. In one example, the plurality of first nozzles 314 expel lubricant in a direction parallel to the plurality of radial nozzles 309 and normal to the central axis 399.

The lubricant, expelled from the plurality of first nozzles 314, may enter an outer angled channel 318, where the lubricant may flow in a direction angled to the central axis 399 and the radially outward direction toward the bearings 316. By doing this, lubricant in the outer channel 317 may provide additional cooling to the rotor shaft 302 and flow to the bearings 316

A separate portion of the lubricant may flow across an overflow portion 320 of the interior channel 303. The lubricant may form a film near a plurality of second nozzles 322. In one example, a size of the plurality of second nozzles 322 may be larger than a size of the plurality of first nozzles 314. The plurality of second nozzles 322 may be arranged downstream of the plurality of first nozzles 314 relative to a direction of lubricant flow. In some embodiments, additionally or alternatively, a number of the plurality of second nozzles 322 may be greater than a number of the plurality of first nozzles 314. In one example, the number of the plurality of second nozzles 322 is greater than two and the number of the plurality of first nozzles 314 is equal to two. The number of the plurality of second nozzles 322 may include exactly 8 nozzles. In some embodiments, additionally or alternatively, the plurality of second nozzles 322 may include diameters greater than diameters of the plurality of first nozzles 314.

The plurality of second nozzles 322 may direct lubricant to an inner diameter of end windings of a stator (e.g., end windings 204 of stator 202 of FIG. 2). Additionally or alternatively, the plurality of second nozzles 322 may direct lubricant to laminations of the rotor. A direction of lubricant flow may flow in a radially outward direction normal the central axis 399 of the rotor shaft 302. An example direction of lubricant flow is shown via arrows in FIG. 3 and in FIG. 7, which is described in greater detail below.

Turning now to FIG. 4, it shows an example 400 of coolant flow through the lance 306, the plurality of radial nozzles 309, the plurality of first nozzles 314, and the plurality of second nozzles 322. As such, components previously introduced may be similarly numbed in this and subsequent figures.

Turning now to FIG. 5, it shows an example 500 of a lubricant film formation on an inner diameter of the lubricant distributor 310 as lubricant sprays from the plurality of radial nozzles 309 and mixes with air. Embodiment 500 further illustrates a difference in opening size of the plurality of first nozzles 314 and the plurality of second nozzles 322.

Turning now to FIG. 6, it shows an embodiment 600 of the rotor shaft 302 including an air-intake channel 602. The air-intake channel 602 may promote the formation of an oil film on an inner surface of the lubricant distributor 310. Additionally or alternatively, if the lubricant is not evacuated at a desired rate through the plurality of second nozzles 322, then excess lubricant may be guided directly to the gearbox, as shown in FIG. 7.

FIGS. 7 and 8 illustrate example cross-sectional views 700 and 800, respectively, of an electric motor 702 comprising the rotor shaft 302 and the lubricant distributor. Solid line arrows indicate lubricant flow guided by the lance and other features. Dashed lines indicate lubricant draining from the stator and/or windings to a gearbox.

The outer angled channels 318, in combination with the plurality of radial nozzles 309, direct the lubricant to the bearings 316. A plurality of outer nozzles 722, in combination with an outer radial passage 724 and an outer axial passage 726 guide the lubricant to the laminations of the rotor and to the stator end windings. The outer radial passage 724, the outer axial passage 726, and the plurality of outer nozzles 722 are arranged outside of the shaft The axial opening in the shaft, may guide the excess of oil toward the gearbox. In one example, motor and gearbox are connected to the same sump.

The disclosure provides support for a rotor assembly of an electric motor including a shaft, a lubricant distributor inserted into the shaft, the lubricant distributor comprising a first section comprising a plurality of first nozzles and a second section comprising a plurality of second nozzles, the lubricant distributor further comprising an overflow portion arranged between the first and second sections, and a lance positioned adjacent to the first section of the lubricant distributor, the lance comprising a plurality of radial nozzles. A first example of the rotor assembly further includes where the lubricant distributor is configured to rotate with the shaft. A second example of the rotor assembly, optionally including the first example, further includes where the lance is stationary. A third example of the rotor assembly, optionally including one or more of the previous examples, further includes where the lance comprises a first arm integrally arranged in a body of the electric motor and a second arm interior to the first section of the lubricant distributor. A fourth example of the rotor assembly, optionally including one or more of the previous examples, further includes where the plurality of radial nozzles of the lance is configured to spray lubricant from a conduit of the lance to an inner diameter surface of the lubricant distributor. A fifth example of the rotor assembly, optionally including one or more of the previous examples, further includes where an axial air intake channel is positioned between the lubricant distributor and the lance. A sixth example of the rotor assembly, optionally including one or more of the previous examples, further includes where the plurality of first nozzles of the lubricant distributor flow lubricant to bearings. A seventh example of the rotor assembly, optionally including one or more of the previous examples, further includes where the plurality of second nozzles of the lubricant distributor flow lubricant to an inner diameter of end windings.

The disclosure further provides support for an electric motor including a rotor shaft, a lubricant distributor inserted into the rotor shaft, the lubricant distributor comprising a plurality of first nozzles configured to lubricate bearings and a plurality of second nozzles configured to lubricant rotor laminations, a static lance having a plurality of radial nozzles, the lance extending into a conduit of the rotor shaft interior to the lubricant distributor, and an air gap arranged between the lubricant distributor and the static lance. A first example of the electric motor further includes an overflow protrusion arranged between the plurality of first nozzles and the plurality of second nozzles. A second example of the electric motor, optionally including the first example, further includes where a lubricant film is present on an inner surface of the lubricant distributor, and wherein the overflow protrusion is free of the lubricant film. A third example of the electric motor, optionally including one or more of the previous examples, further includes where a number of the plurality of second nozzles is greater than a number of the plurality of first nozzles. A fourth example of the electric motor, optionally including one or more of the previous examples, further includes where a size of the plurality of second nozzles is greater than a size of the plurality of first nozzles. A fifth example of the electric motor, optionally including one or more of the previous examples, further includes where the plurality of first nozzles flow lubricant to axial passages in contact with an outer diameter of the lubricant distributor, further comprising angled passages configured to flow lubricant from the axial passages to the bearings. A sixth example of the electric motor, optionally including one or more of the previous examples, further includes where the plurality of first nozzles are closer to the lance than the plurality of second nozzles.

The disclosure additionally provides support for a method for an electric motor including flowing lubricant through a static lance to a lubricant distributor, generating a first film on an inner diameter of the lubricant distributor of the electric motor via air from an axial air intake channel, and cooling bearing via the first film. A first example of the method further includes where lubricant generating the first film is sprayed by a plurality of radial nozzles arranged on a second arm of the lance normal to a first arm, wherein the second arm extends into the lubricant distributor and a shaft. A second example of the method, optionally including the first example, further includes generating a second film on an inner diameter of the shaft via spraying lubricant from a plurality of first nozzles of the lubricant distributor. A third example of the method, optionally including one or more of the previous examples, further includes flowing lubricant from the second film through outer angled passages to bearings. A fourth example of the method, optionally including one or more of the previous examples, further includes flowing excess lubricant provided to the lubricant distributor through a plurality of second nozzles of the lubricant distributor to a sump.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A rotor assembly of an electric motor, comprising:
- a shaft;
- a lubricant distributor inserted into the shaft, the lubricant distributor comprising a first section comprising a plurality of first nozzles and a second section comprising a plurality of second nozzles, the lubricant distributor further comprising an overflow portion arranged between the first and second sections; and
- a lance positioned adjacent to the first section of the lubricant distributor, the lance comprising a plurality of radial nozzles, wherein the lance comprises a first arm integrally arranged in a body of the electric motor and a second arm, that is normal to the first arm, interior to the first section of the lubricant distributor, and wherein the second arm terminates in the first section of the lubricant distributor, and the plurality of radial nozzles are positioned upstream of the plurality of first nozzles.

2. The rotor assembly of claim 1, wherein the lubricant distributor is configured to rotate with the shaft.

3. The rotor assembly of claim 1, wherein the lance is stationary, and wherein a first air intake channel is arranged between the first arm and the first section of the oil distributor, and a second air intake channel is arranged downstream of the plurality of second nozzles.

4. The rotor assembly of claim 1, wherein the rotor shaft comprises an interior channel.

5. The rotor assembly of claim 1, wherein the plurality of radial nozzles of the lance is configured to spray lubricant from a conduit of the lance to an inner diameter surface of the lubricant distributor.

6. The rotor assembly of claim 1, wherein the plurality of first nozzles of the lubricant distributor flow lubricant to at least one bearing.

7. The rotor assembly of claim 6, wherein the plurality of second nozzles of the lubricant distributor flow lubricant to an inner diameter of end windings.

8. An electric motor, comprising:
- a rotor shaft;
- a lubricant distributor inserted into the rotor shaft, the lubricant distributor comprising a plurality of first nozzles configured to lubricate at least one bearing and a plurality of second nozzles configured to lubricant rotor laminations;
- a static lance having a plurality of radial nozzles, the lance extending into a conduit of the rotor shaft interior to the lubricant distributor, wherein the static lance comprises a T-shape, and wherein the lance terminates upstream of the plurality of second nozzles, and the plurality of radial nozzles are positioned upstream of the plurality of first nozzles; and
- an air gap arranged between the lubricant distributor and the static lance.

9. The electric motor of claim 8, further comprising an overflow portion arranged between the plurality of first nozzles and the plurality of second nozzles.

10. The electric motor of claim 9, wherein a lubricant film is present on an inner surface of the lubricant distributor, and wherein the overflow portion is free of the lubricant film.

11. The electric motor of claim 8, wherein a number of the plurality of second nozzles is greater than a number of the plurality of first nozzles.

12. The electric motor of claim 8, wherein a size of the plurality of second nozzles is greater than a size of the plurality of first nozzles.

13. The electric motor of claim 8, wherein the plurality of first nozzles flow lubricant to axial passages in contact with an outer diameter of the lubricant distributor, further comprising angled passages configured to flow lubricant from the axial passages to the bearings.

14. The electric motor of claim 8, wherein the plurality of first nozzles are closer to the lance than the plurality of second nozzles, and wherein the rotor shaft comprises an interior channel, and wherein the gap is an axial air intake channel configured to flow air into the interior channel.

15. A method for an electric motor comprising a rotor assembly including a shaft and a lubricant distributor inserted into the shaft, the method comprising:

flowing lubricant through a static lance to a first section of the lubricant distributor via a plurality of radial nozzles arranged on the lance, wherein the static lance comprises a T-shape, the static lance terminates in the first section of the lubricant distributor upstream of a second section of the lubricant distributor, and wherein the plurality of radial nozzles are arranged upstream of a plurality of first nozzles of the lubricant distributor;

generating a first film on an inner diameter of the lubricant distributor of the electric motor via air from an axial air intake channel; and cooling a bearing via the first film.

16. The method of claim 15, wherein lubricant generating the first film is sprayed by the plurality of radial nozzles arranged on a second arm of the lance normal to a first arm, and wherein the second arm extends into the lubricant distributor and the shaft, and terminates in the first section of the lubricant distributor.

17. The method of claim 16, further comprising generating a second film on an inner diameter of the shaft via spraying lubricant from the plurality of first nozzles of the lubricant distributor, the plurality of first nozzles of the lubricant distributor arranged in the first section of the lubricant distributor.

18. The method of claim 17, further comprising flowing lubricant from the second film through outer angled passages to the bearing.

19. The method of claim 17, further comprising flowing excess lubricant provided to the lubricant distributor through a plurality of second nozzles of the lubricant distributor to a sump, the plurality of second nozzles arranged in the second section of the lubricant distributor, downstream of the first section of the lubricant distributor.

* * * * *